April 5, 1927.
H. C. McGREGOR ET AL
1,623,259
DEMOUNTABLE SEAT
Filed May 11, 1925
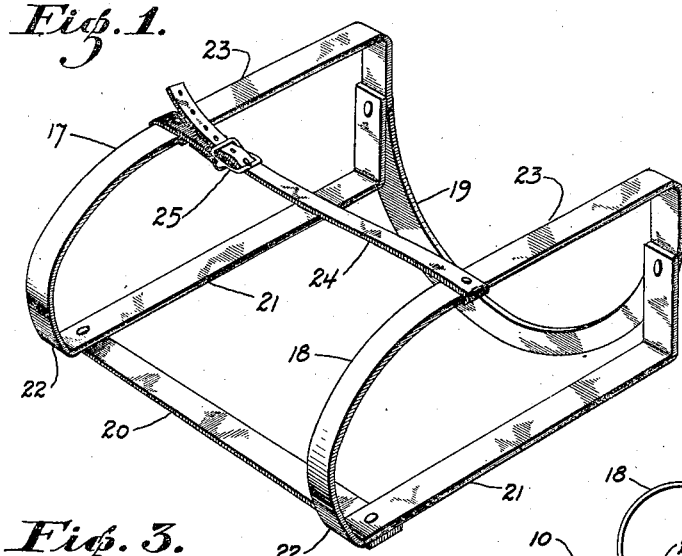
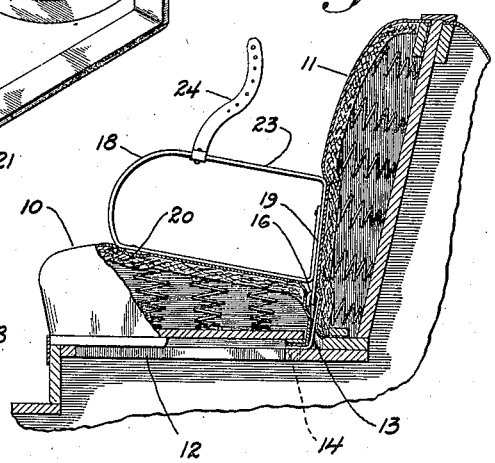
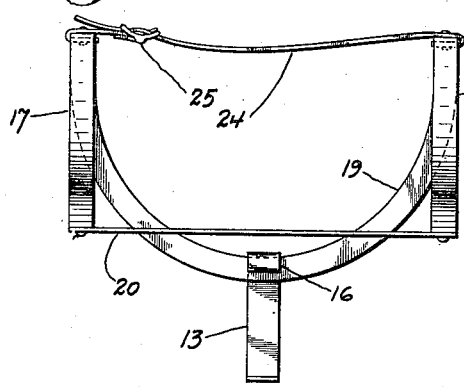
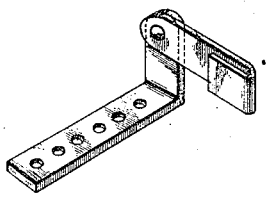
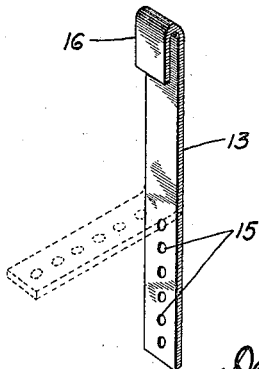
INVENTORS.
Herman C. McGregor.
Donald B. McGregor.
BY
ATTORNEYS Patented Apr. 5, 1927.

1,623,259

UNITED STATES PATENT OFFICE.

HERMAN C. McGREGOR AND DONALD B. McGREGOR, OF BERKELEY, CALIFORNIA.

DEMOUNTABLE SEAT.

Application filed May 11, 1925. Serial No. 29,313.

This invention relates to accessories for automobiles, and particularly pertains to a demountable seat therefor.

It often occurs that the driver of an automobile is accompanied by a small child who cannot be held with convenience while driving the car, and it is the principal object of the present invention to provide a demountable seat which may be readily installed within the car or removed therefrom, and which seat affords convenient means for supporting a small child and holding the child so that it will not fall from the seat while unattended by an accompanying person.

The present invention contemplates the use of a seat frame structure adapted to be mounted upon the uppermost seat of an automobile, utilizing the upholstered back cushion and the seat cushion in conjunction therewith, said seat frame being detachably secured by concealed means and being held in its installed position by the expansive action of the seat cushions.

The invention is illustrated by way of example in the accompanying drawings, in which:

Fig. 1 is a view in perspective showing the complete seat structure with which the present invention is concerned.

Fig. 2 is a view in transverse section through an automobile seat and showing the manner of installation of the present invention.

Fig. 3 is a view in front elevation showing the frame structure with its attaching means.

Fig. 4 is a view in perspective showing the seat attaching member as originally supplied and indicating in dotted lines the manner in which it is adapted for use with the seat of a particular thickness.

Fig. 5 is a view showing a modified form of the attaching member in which the hook is pivoted so that it may be swung from a disclosed position above the seat cushion when used to a concealed position below the seat cushion when not used.

Referring more particularly to the drawing, 10 indicates a seat cushion and 11 indicates a back cushion suitably mounted and carried on the frame structure of an automobile seat. The seat cushion 10 is supported on the usual seat board 12. Secured to this seat board and extending upwardly between the rear of the seat cushion 10 and the back cushion 11 is an attaching member 13.

This member when applied is in the form of an angle, the horizontal portion of which receives screws 14 through its perforations 15. These screws fasten the attaching means to the seat board 12. The opposite or vertical leg of the member 13 terminates in a hook 16. This hook is so formed that its throat is in front of the body member of the attaching means for a purpose which will be hereinafter set forth.

When the present device is applied, the attaching member 13 is formed with the hook 16 at one end and is otherwise flat, as indicated by solid lines in Fig. 4, the flat portion being perforated at intervals throughout its length. When the device is to be installed, the flat portion of the attaching member 13 may be readily bent so that the hook 16 will be disposed at a desired point below the level of the top of the seat cushion 10. This point will vary with seat cushions of different depths as will be understood. It is desirable, however, that the hook 16 shall be disposed at a point below the level of the top of the seat cushion so that it will not be exposed to view, nor will be encountered by a person sitting on the seat and deflecting the cushion.

The seat structure with which the present invention is concerned is generally indicated in Fig. 1 of the drawing, where it will be seen to comprise side arm structure 17 and 18, a transverse back member 19, and a transverse front member 20. The side arm structures 17 and 18 and the back member 19 are here shown as made of a continuous piece of flat metal stock.

The side arm structures comprise horizontally extending cushion engaging portions 21 terminating at their forward ends in upwardly extending portions 22, which are bent rearwardly and continue horizontally to form arm rests 23. These rests are connected by the arcuate back member 19 which extends from the end of one arm rest 23 to the other and curves downwardly to project into the crack between the back of the seat cushion 10 and the front of the back cushion 11, as clearly shown in Fig. 2. Its downwardly curved portion 19 may then be brought into engagement with the hook 16 of the attaching member 13 to hold the seat structure in position.

The forward ends of the side arms 17 and 18 are rigidly connected by the transverse strap of metal 20 which is fastened by its opposite ends to the horizontal members 21. A leather strap 24 is fastened by its opposite ends to the arm rests 23, and may be suitably connected at points between the arms by a buckle or other fastening means 25.

In operation of the present invention, the seat structure is assembled as shown in the drawing and an attaching member 13 is provided as indicated in solid lines in Fig. 4. The seat cushion 10 may then be removed from its position on the seat board 12 and the body portion of the attaching member 13 may then be bent at right angles, as indicated by dotted lines in Fig. 4, to form the angle shaped structure shown in Fig. 2, care having been taken to insure that the position of the hook 16 under the attaching member 13, as mounted on the seat board 12, would be sufficiently low to conceal it between the back of the seat cushion and the front of the back cushion. The attaching member 13 may then be secured in position by the screws 14 and the cushion 10 may thereafter be replaced in its intended position on the seat board.

The seat structure may then be mounted in its operative position by disposing the downwardly projecting curved portion of the back member 19 between the rear of the seat cushion 10 and the front of the back cushion 11, at the same time applying force both rearwardly and downwardly to deflect the seat cushion and the back cushion so that the curved portion of the back member 19 will move down between the two cushions and pass under the hook 16.

The pressure of the back cushion against the rear portion 19 of the seat structure will tend to hold the seat structure down upon the seat cushion, and at the same time the action of the seat cushion, springs and upholstery will tend to hold the curved portion of the back member 19 in constant engagement with the hook 16 of the attaching member.

The straps 24 may then be unbuckled so that a child may be seated between the two arm structures 17 and 18 while resting on the seat cushion 10 and being able to lean back against the back cushion 11, after which the strap may be buckled to prevent the child from falling or slipping from the seat.

It will thus be seen that by the simple means here disclosed a seat structure may be readily and conveniently mounted upon the upholstered seat of an automobile for the purposes herein specified.

While we have shown the preferred form of our invention as now known to us, it will be understood that various changes may be made in its construction without departing from the spirit of the invention as defined in the appended claims.

Having thus described our invention, what we claim and desire to secure by Letters Patent is:

1. A substantially rigid auxiliary seat frame comprising the combination of a pair of side arm members, means connecting such members and holding the same in spaced relation, a portion of the rear end of the frame projecting laterally away therefrom, the frame being adapted to rest on an automobile seat and engaged against the back thereof with the said rear portion projecting downwardly between the seat and back cushion, and means adapted to be secured to the automobile and to cooperate with the said rear portion to hold the frame in place on the seat, the structure permitting the occupant of the seat frame to be held therein by a strap extending across the frame and connected to the arm members.

2. A substantially rigid auxiliary seat frame comprising the combination of a pair of side arm members, means connecting such members and holding the same in spaced relation, certain of such members being at the rear of the frame in a position extending downwardly between the seat and back cushions of an automobile seat when the frame is placed in its operative position thereon, and means adapted to be secured to the automobile and detachably engage the last said means to hold the frame in place on the seat.

3. A substantially rigid auxiliary seat frame comprising a pair of side arm members, the rear and bottom portions of said members substantially conforming in contour with the back and cushion of the seat, rigid connections between said side arm members maintaining them in parallelism and at a spaced distance apart, one of said connections being located at the rear of the frame, and means adapted to be secured between the seat cushion and the back thereof and adapted to detachably engage said rear connection to maintain the frame in position on the seat.

4. An auxiliary seat frame comprising the combination of a pair of rectangular loops formed of rigid strap material, and means connecting the loops and holding the same in spaced relation whereby they form the side arm members of the frame, the frame being adapted to rest on an automobile seat and the straps forming the bottom seat-engaging portions of the loops being in a common plane whereby the same rest flat on the seat, the means connecting the loops at the rear projecting downwardly from the bottom of the frame whereby it will extend downwardly between the seat and back cushion in a manner holding the frame in place when the frame is in the operative position on the seat.

5. An auxiliary seat frame comprising the combination of a pair of ectangular loops and a rear connection formed of one piece of strap metal, the loops being held in spaced relation whereby they form the side arm members of the frame, the frame being adapted to rest on an automobile seat and the strap portions forming the bottom seat-engaging portion of the loops being in a common plane whereby the same rest flat on the seat, the strap portion forming the said rear connection lying in substantially the same plane as the surface of the back cushion and contiguous to the junction of the back cushion and seat cushion, and means fixed between said cushions and detachably engaging said rear connection in a manner holding the frame in place when the seat is in operative position on the seat.

HERMAN C. McGREGOR.
DONALD B. McGREGOR.